United States Patent [19]

Yoshida

[11] Patent Number: 4,564,778
[45] Date of Patent: Jan. 14, 1986

[54] DC BRUSHLESS ELECTROMAGNETIC ROTARY MACHINE
[75] Inventor: Makoto Yoshida, Machida, Japan
[73] Assignee: Aupac Co., Ltd., Tokyo, Japan
[21] Appl. No.: 590,285
[22] Filed: Mar. 16, 1984
[30] Foreign Application Priority Data Mar. 31, 1983 [JP] Japan ................................ 58-55561

[51] Int. Cl.⁴ .......................................... H02K 23/00
[52] U.S. Cl. .................................... 310/177; 310/156; 310/181; 310/186
[58] Field of Search ................. 310/46, 152, 156, 178, 310/216, 112, 179, 185, 187, 224, 223, 254, 255, 258, 186, 188, 177, 190, 191, 154

[56] References Cited

U.S. PATENT DOCUMENTS

| | | | |
|---|---|---|---|
| 1,334,832 | 3/1920 | Bergman | 310/186 |
| 1,976,499 | 10/1934 | Hochstetter | 310/185 |
| 3,201,626 | 8/1965 | Calabrese | 310/186 |
| 3,411,027 | 11/1968 | Rosenberg | 310/181 |
| 3,999,092 | 12/1976 | Whiteley | 310/156 |
| 4,181,867 | 1/1980 | Muller | 310/156 |
| 4,357,563 | 11/1982 | Ohno | 310/156 |
| 4,435,664 | 3/1984 | Boesel | 310/187 |
| 4,451,752 | 5/1984 | Tahara | 310/186 |
| 4,486,678 | 12/1984 | Olson | 310/156 |
| 4,494,028 | 1/1985 | Brown | 310/156 |

Primary Examiner—R. Skudy
Attorney, Agent, or Firm—Thomas R. Vigil

[57] ABSTRACT

A dc brushless electromagnetic rotary machine, such as a dc electric motor, a dc electrical generator, includes a rotor having a permanent magnet which is cylindrical outer peripheral surface magnetized in the same polarity. The outer surface faces armature cores fixed on the inner cylindrical surface of a casing frame forming a stator of the machine. In the structure, the magnetic flux emanating from the rotor magnet passes the armature cores and returns to the magnet from a position other than the armature cores. The armature core is provided with coil windings wound thereon in such a manner that a portion of the windings is included in the air gap formed between the rotor magnet and the cores. Additional magnetic flux induced in response to current flowing over the armature windings causes the main magnetic flux generated from the rotor magent to be turned in the same way irrespective of the angular position of the rotor. Consequently, continuous rotation of the rotor will be accomplished in the case of dc motors, and continuous generation of dc power will be achieved in the case of dc generators.

17 Claims, 20 Drawing Figures

DC BRUSHLESS ELECTROMAGNETIC ROTARY MACHINE

BACKGROUND OF THE INVENTION

1. Field of the Invention

The present invention relates to a dc brushless electromagnetic rotary machine, such as a dc electric motor or, a dc electrical generator, for transducing electrical energy into mechanical energy, or vice versa.

2. Description of the Prior Art

With a conventional dc electric motor, for example, a combination of brushes and commutators has often been used for mechanically switching in direction the current directed to coil windings of armatures involved for continuous generation of torque in a certain angular direction. Rotary electric machines of such a type are however, disadvantageous in that the frictional contact of the brushes with the circumferential surface of the commutators, result in generating mechanical and electrical noises including mechanical vibrations and riples, which are significant disadvantages degrading the performance of the machines.

In the prior art also, there are brushless motors of the type which have a sensor, such as a photosensitive device, a Hall generator, together with electronics adapted to sense the angular position of a rotor so as to switch the current flowing through armature windings to generate a continuous torque in an intended angular dierction of a rotary member. The motors of that type are advantageous in including no frictional contact member such as brushes and commutators, being free from the disadvantages as caused in the motors discussed in the preceding paragraph. The electronics circuitry used in the prior art brushless motors gives rise to complexity in circuit configuration of the motors and hence expensiveness in price, and may also be affected by warm or hot environment, under about 70 degrees centigrade or more, for example.

With conventional dc electric generators, the same difficulties arise since they have the same structural features as that of the motors. This can easily be seen from the fact that, for example, driving a rotor of a dc motor by any driving means will make it function as a generator to produce electric energy induced across its armature windings.

SUMMARY OF THE INVENTION

It is therefore an object of the present invention to provide a dc brushless electromagnetic rotary machine which is free from the prior art drawbacks described above, and which is, simple in structural and circuit configuration.

In accordance with the present invention, a dc brushless electromagnetic rotary machine, such as a dc electric motor or, a dc electrical generator, includes a rotor having a permanent magnet which has a cylindrical outer peripheral surface magnetized in the same polarity. The outer surface faces armature cores fixed on the inner cylindrical surface of a casing frame forming a stator of the machine. In the structure, the magnetic flux emanating from the rotor magnet passes the armature cores and returns to the magnet from a position other than the armature cores. The armature core is provided with coil windings wound thereon in such a manner that a portion of the windings is included in the air gap formed between the rotor magnet and the cores. Additional magnetic flux induced in response to current flowing over the armature windings causes the main magnetic flux generated from the rotor magnet to be turned in the same way irrespective of the angular position of the rotor. Consequently, continuous rotation of the rotor will be accomplished in the case of dc motors, and continous generation of dc power will be achieved in the case of dc generators.

A dc brushless electromagnetic rotary machine will therefore be provided with complicated structural and circuit features together with mechanical and electrical noises due to frictional contact as with the conventional ones.

In accordance with the present invention, a dc electromagnetic rotary machine comprises: permanent magnet means for producing magnetic flux. The magnet means having a generally circular hollow shape which has one surface portion magnetized in one magnetic polarity and the other surface portion magnetized in the other magnetic polarity opposite to the one polarity; rotor shaft means for fixedly carrying the magnet means thereon; casing means including a magnetically permeable substance for rotatably supporting the rotor shaft means; armature core means fixedly supported by the casing means so as to face substantially the one surface portion of the magnet means for permeating the magnetic flux therethrough; coil means supported by the armature core means for conducting current therethough, a portion of the coil means being positioned in a gap formed between the armature core means and the magnet means; and magnetic-path forming means positioned between the casing means and the magnet means for bridging the magnetic flux between the casing means and the magnet means; whereby the current flowing over the coil means causes the magnetic flux emanating from the magnet means to be turned partially.

BRIEF DESCRIPTION OF THE DRAWINGS

The objects and features of the present invention will become more apparent from the consideration of a following detailed description taken in conjunction with the accompanying drawings in which.

DESCRIPTION OF THE PREFERRED EMBODIMENTS

Figure 1:
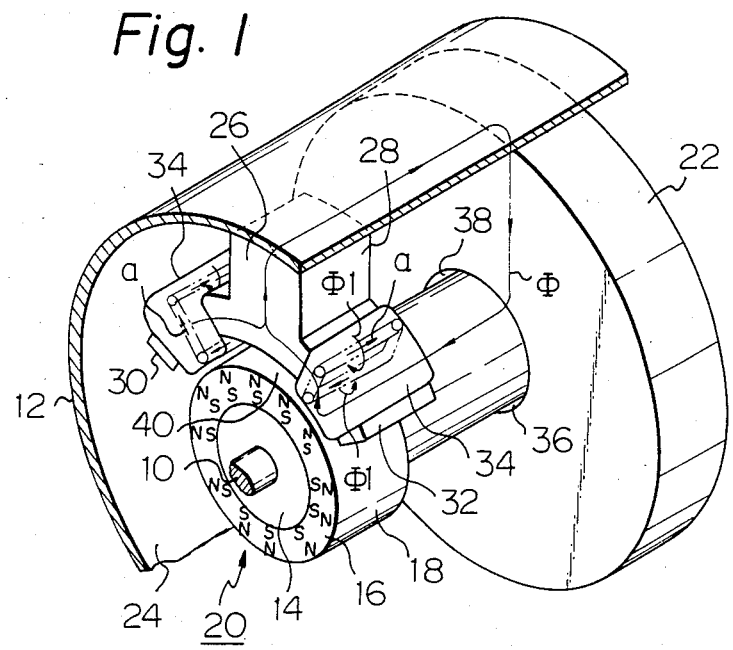
FIG. 1 is a partially broken-out perspective view showing a preferred embodiment of a brushless electric motor construction in accordance with the present invention, and useful for understanding the principle of the present invention.
Figure 2:
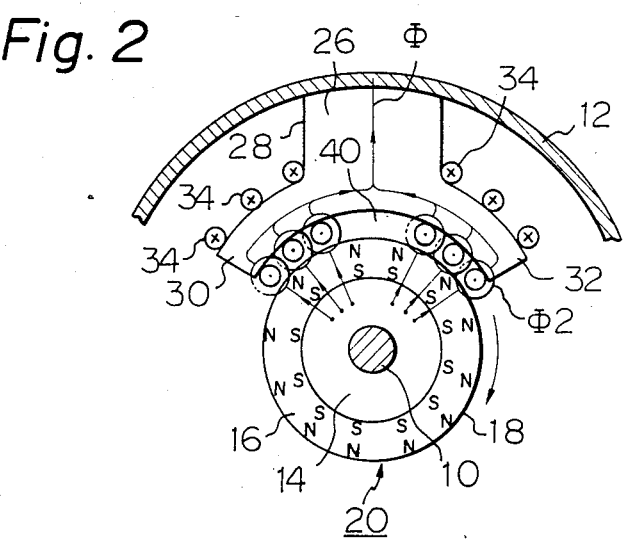
FIG. 2 shows the side end portion of the motor viewed from the left in FIG. 1.

With reference to FIGS. 1 and 2, an illustrative embodiment of the present invention is directed to a dc brushless electric motor including a rotary shaft 10 which is rotatably supported by supporting means, not shown, the latter being fixed on a stator frame 12. Shaft 10 and frame 12 are made of magnetically permeable material. Stator frame 12 is generally cylindrical to enclose the substantial portions of the motor, and fixed on the base thereof, not shown.

On rotary shaft 10, fixedly carried on rotary shaft 10 is a yoke 14, which is generally cylindrical and made of laminated layers of fixedly carried on magnetic substance. Magnetic yoke 14 is a permanent magnet that is also generally cylindrical so as to cover at least partially the outer periphery of yoke 14. Permanent magnet 16 is polarized in a predetermined orientation, in which magnet 16 has its outer cylindrical circumference 18 magnetized in one magnetic polarity, and its inner cylindrical periphery in the other polarity which is opposite to the one polarity. In the illustrative embodiment, outer circumference 18 has a north (N) magnetic pole and inner circumference has a south (S) magnetic pole, as shown in the figures. Shaft 10, yoke 14 and magnet 16 form a rotor of the motor, as generally indicated by a reference numeral 20 in the figures.

Within stator frame 12, there is provided a magnetic-path forming member 22 which is spaced from magnet 16 in the longitudinal direction of shaft 10. Magnetic-path forming member 22 is generally of a disk-like or rather thin cylindrical shape and is fixed on the inner cylindrical peripheral surface 24 thereof. Alternatively, member 22 may be fixed on rotor shaft 10. Member 22 is also advantageously made of laminated layers of magnetic substance in order to conduct magnetic flux effectively therewithin. Member 22 has an opening 34 which is generally cylindrical to enable yoke 14 to pass or extend therethrough. A small spacing or air gap 38 is formed in between the member 22 and the yoke 14 (FIG. 1).

In the illustrative embodiment, a pair of armature cores 26 are also fixedly supported on inner surface 24 of frame 12 in a longitudinal position facing outer surface 18 of magnet 16. For simplicity only, only one of cores 26 is depicted in FIGS. 1 and 2 as compared to the other drawing figures. Armature cores 26 are generally of a Y-shape with its leg portion 28 fixed on inner surface 24 at the end portion thereof. Armature cores 26 may preferably be made of laminated layers of magnetic substance, and have a pair of arms 30 and 32, on which armature coil windings 34 are supported one for each. The pair of arcuate arms 30 and 32 curve and extend opposites each other generally along and over outer surface 18 of magnet 16 with a spacing or air gap 40 formed against outer surface 18 of magnet 16 so as to concentrate and conduct the magnetic flux $\Phi$ therein. The magnetic flux originates from permanent magnet 16, and is directed to leg 26, as clearly understood from FIG. 2.

In the illustrative structure, magnetic flux $\Phi$ generated from permanent magnet 16 is conducted through gap 40, arms 30 or 32, armature core 26, frame 12, flux forming member 22, gap 38 and rotary yoke 14, and returned to magnet 16, as shown in the figures by a loop of the arrows.

In operation, when current is conducted through coil windings 34, additional flux $\Phi_1$ is induced around windings 34, as depicted by the arrow in FIG. 1. The additional flux $\Phi_1$ causes primary flux $\Phi$ to be partially turned therearound as shown by $\Phi_a$ in FIG. 2. Such turning of flux $\Phi_2$ gives rise to application of a clockwise torque to rotor 20 as shown in FIG. 2, in this instance.

Since the permanent magnet 16 is magnetized in such a manner that the outer peripheral portion thereof has substantially the same uniform polarity, north pole, for example, as discussed before, primary magnetic flux $\Phi$ is maintained constant in direction, so that the intersectional relationship between the primary flux $\Phi$ and the thus turned flux $\Phi_2$ is also maintained the same. This constantness will result in continuous rotation of rotor 20 in the clockwise direction if the current is continuously supplied in the same direction to armature coil windings 34.

If current is supplied to armature windings 34 in the other direction opposite to that described above, then the magnetic flux $\Phi$ generated from magnet 16 possess the opposite way near windings 34 in gap 40 as depicted by the dotted lines in FIG. 2. This results in applying continuous torque to rotor 20 in the counterclockwise direction in FIG. 2 to revolve rotor 20 in the opposite direction continuously. Namely, switching of the current supplied to armature windings 34 will effect turning of rotational direction of rotor 20. The degree of extent of turning the main flux $\Phi$ is associated with the current flowing through windings 34, and hence the voltage applied across them, so that the higher the voltage goes, the faster the rotor 20 rotates.

The preferred embodiment described with reference to FIGS. 1 and 2 will more specifically be described with reference to FIGS. 3, 4 and 5. In the figures, similar components or structural elements are designated by the same reference numerals, and redundant description will be avoided for simplicity. As seen from those figures, rotor shaft 10 is rotatably supported by means of bearings 50 and 52 on side members 54 and 56, respectively, which are coupled with stator frame 12. Spacing of flux forming member 22 from armature cores 26 in the longitudinal direction of shaft 10 is maintained by a spacer or spacers 58, which may advantageously be a single annular member. The armature cores 26 are disposed opposite each other and have the arms 30, 32 extending generally parallel the cylindrical surface 18 of the permanent magnet 16. Armature windings 34 may advantageously be interconnected with each other in parallel or serial to a dc power source, not shown, by way of a polarity changeover switch or circuit, not shown and also, for switching the directions of the currents to be supplied to windings 34.

Figure 3:
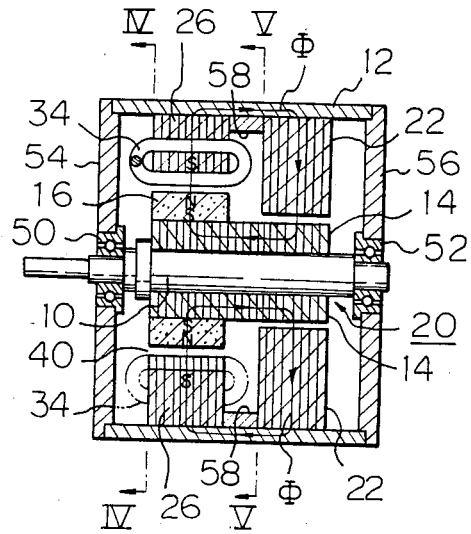
FIG. 3 is a longitudinal cross-sectional view showing more in detail the embodiment shown in FIGS. 1 and 2, the end face shown being cut along the dotted line III in FIG. 4.

Main magnetic flux $\Phi$ originating from permanent magnet 16 forms loops depicted in FIG. 3. The current flowing through armature windings 34, of which the direction is indicated by dots included in circles showing windings 34, causes additional flux $\Phi 1$ to be induced therearound, so that primary flux $\Phi$ is turned or curved as shown in FIG. 4. Accordingly a continuous torque is applied to rotor 20 to revolve it in an angular direction, which is dependent upon the relationship between the current direction and the magnetization polarity of magnet 16, as described before in detail.

Figure 6:
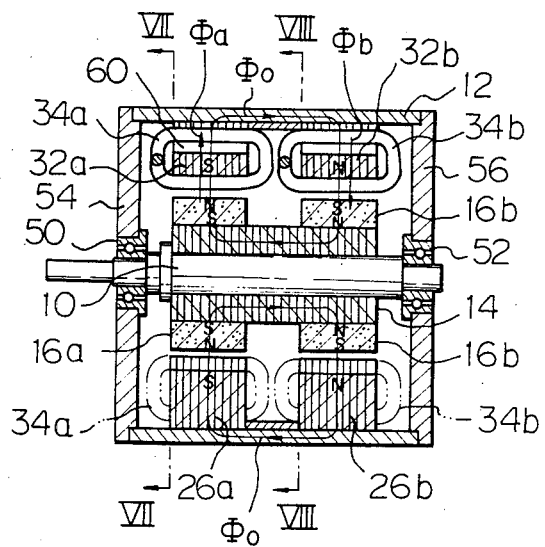
FIGS. 6, 7 and 8 are views similar to FIGS. 3, 4 and 5, respectively, and show an alternative embodiment of the present invention, the cutting lines being shown by capital Roman numerals corresponding to the numbers of the figures.
Figure 7:
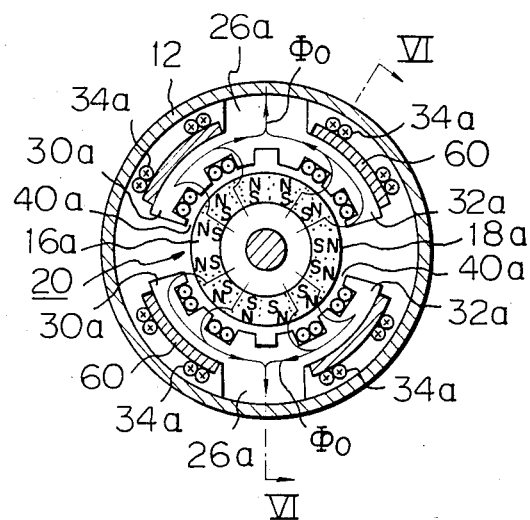
Figure 8:
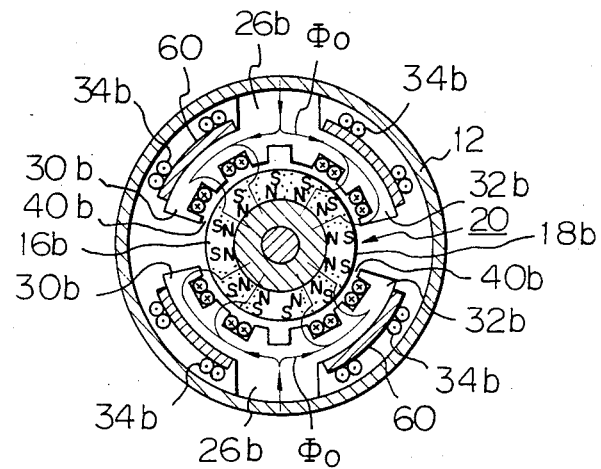

An alternative embodiment of a dc motor constructed in accordance with the present invention is shown in FIGS. 6, 7 and 8 and shall now be described below. In the alternative embodiment, rotor shaft 10 carries thereon a pair of permanent magnets 16a and 16b via yoke 14. One permanent magnet 16a, for example, is magnetized in such a fashion that its outer and inner peripheral portions have north and south poles, respectively, while the other magnet 16b is magnetized vice versa, i.e. its outer and inner peripheral portions have south and north poles, respectively. Both of the permanent magnets 16a and 16b are spaced in the longitudinal direction by a predetermined distance.

On stator frame 12, two pairs of armature cores 26a and 26b are fixed in such a manner that a pair of arms 30a and 32a, or 30b and 32b thereof face the associated one of outer peripheral surfaces 18a and 18b of rotor magnets 16a and 16b. Each of arms 30a and 32a, and 30b and 32b thereon carries a corresponding one of armature coil windings 34a and 34b so as to have a portion of, or a length of the winding wire pass in the associated air gaps 40a and 40b formed between those arms and outer surfaces 18a and 18b of magnets 16a and 16b. Even number of sets, more than two, of armature cores 16, coil windings 34 and permanent magnets 16 may be provided in alternative embodiments.

In operation, magnetic flux $\Phi a$ and $\Phi b$ emanating from magnets 16a and 16b, respectively, flow through the same path to be combined with each other to form a single loop of magnetic circuit $\Phi o$, as shown schematically by the arrows in FIGS. 6 and 7. The combined magnetic flux $\Phi 0$ emanates from permanet magnet 16a through armature core 26a, FIG. 7, stator frame 12 and the other armature core 26b, FIG. 8, and then sinks into the other permanent magnet 16b.

In these circumstances, current is fed to coil windings 34a and 34b in the directions depicted in FIGS. 7 and 8, in which the direction of the current flowing is shown in such a fashion that the current flows from x marks in the circles representative of windings 34a and 34b into the back of the figures, and then appears to the dot encircled by the circles of windings 34a and 34b. In other words, the current is conducted in the opposite directions through armature windings 34a and 34b. Consequently, the additional magnetic flux induced around coil windings 34a and 34b makes the primary magnetic flux $\Phi 0$ thus combined turn in a predetermined direction, as shown in FIGS. 7 and 8. This turning of the main flux $\Phi 0$ occurs irrespective of the angular position of rotor magnets 16a and 16b. Therefore, torque will continuously be applied to rotor 20 in the same angular direction, as discussed earlier with reference to FIGS. 1 and 2.

The rotor 20 will continouly revolve while the current is supplied to armature windings 34a and 34b, and the direction of the revolution is capable of being switched depending on the direction of the current applied to windings 34a and 34b.

Figure 9:
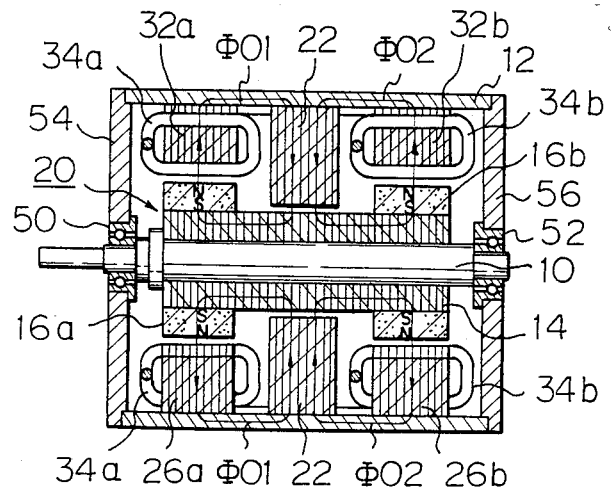
FIG. 9 is a longitudinal cross-sectional view similar to FIG. 3 and shows another embodiment of the present invention.
Figure 10:
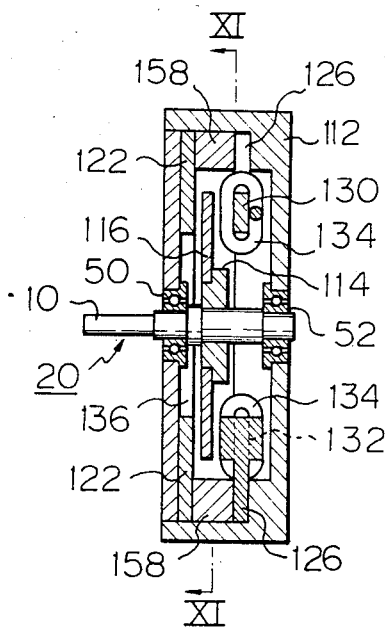
FIGS. 10 and 11 are views similar to FIGS. 3, and 4, respectively, and show a still further alternative embodiment of the present invention.
Figure 11:
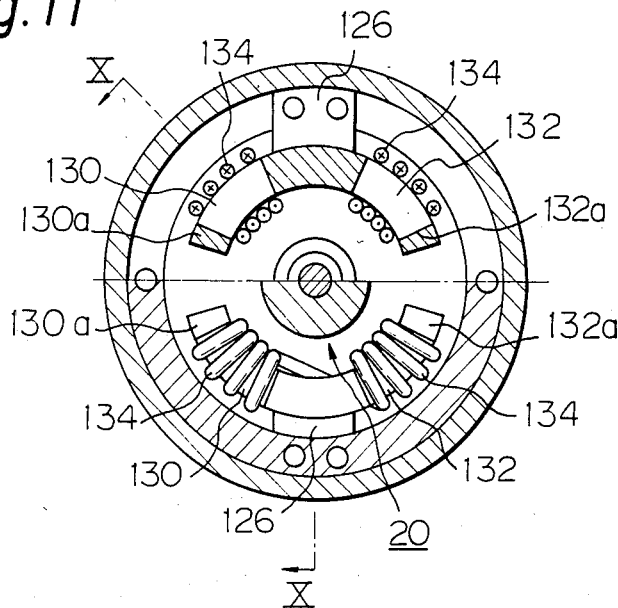
Figure 12:
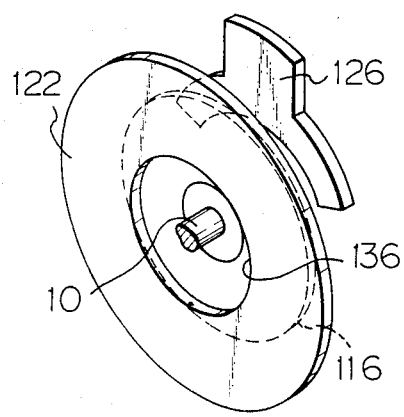
FIG. 12 shows in a perspective view a portion of the motor shown in FIGS. 10 and 11.

Another embodiment of the present invention will be described with reference to FIG. 9, in which stator frame 12 is provided with a magnetic-path forming member 22 between armature cores 26a and 26b so as to isolate one from the other. Accordingly, permanent magnets 16a and 16b are polarized in such a way that both the outer cylindrical surfaces 18a and 18b thereof have the same magnetic pole, e.g. north pole in this instance. That structure makes it possible for armature windings 34a and 34b to receive the current in the same directions, which is different than in the embodiment described with reference to FIGS. 6, 7 and 8. Plural sets, more than two, of armature cores 26, coil windings 34 and permanent magnets 16 may be employed in alternative embodiments.

In operation, the magnetic flux $\Phi 01$ and $\Phi 02$ generated from permanent magnets 16a and 16b, respectively, passes commonly through magnetic-path forming member 22, as shown in the figure. The primary magnetic flux $\Phi 01$ and $\Phi 02$ is turned or curved due to the additional flux induced around armature coil windings 34a and 34b, applying a constant torque to rotor 20 to have it continuously rotate in a certain angular direction dependent upon the direction of the current supplied.

A still further alternative embodiment is shown in FIGS. 10 through 13. This embodiment is directed to a dc motor which is thinner in its longitudinal direction. In this embodiment, rotor 20 has a permanent magnet 116 which is of a flat disk-like shape with its one main surface magnetaized in one polarity, N, and the other main surface in the other polarity, S, in this instance, magnet disk 116 is supported by means of yoke 114 on rotor shaft 10.

A flat cylindrical casing 112, which is made of non-magnetic substance, is fixedly provided with a disk-like magnetic-path forming member 122 and armature cores 126, both of which are separated by a spacer yoke 158 from each other. As clearly seen from FIG. 12, member 122 has a circular opening 136, for receiving the rotatable rotor shaft 10. Armature cores 126 are of a Y-shape with arms 130 and 132 thereof each carrying armature windings 134. End portions 130a and 132a of the armature cores 126 are thicker than the remaining portions thereof in order to prevent the coil windings 134 from dropping by means of the shoulders of the end portions 130a and 132a.

Figure 13:
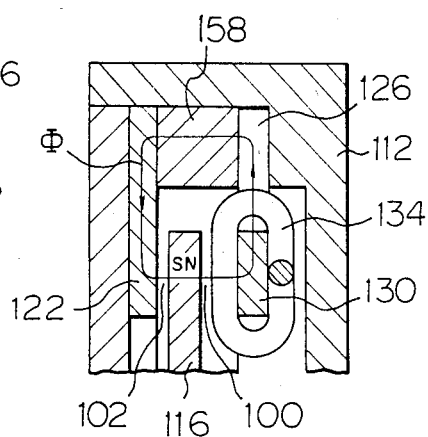
FIG. 13 depicts in an enlarged scale a portion of the motor shown in FIG. 10.

With reference to FIG. 13, the main magnetic flux $\Phi$ produced from rotor magnet 116 starts at the north pole of magnet 116 to pass one air gap 100, arm 130 or 132, armature core 126, yoke 158, magnetic-path forming member 122 and the other air gap 102, and returns to magnet 116 at the south pole thereof. Upon application of current to coil windings 134, the additional magnetic flux thus induced causes the main flux $\Phi$ to be turned locally near windings 134, as in the embodiments described above. Consequently, torque will continuously be applied to rotor 20 in the clockwise direction, (FIG.

11) while the current is continuously fed to windings 134 in the same direction.

Alternative embodiments will be discussed with reference to FIGS. 14 and 15. The embodiment shown in FIG. 14 includes four armature cores 226 each of which has a single arm 230, which projects on one side of leg 128, and on which armature windings 34 are wound.

Figure 15:
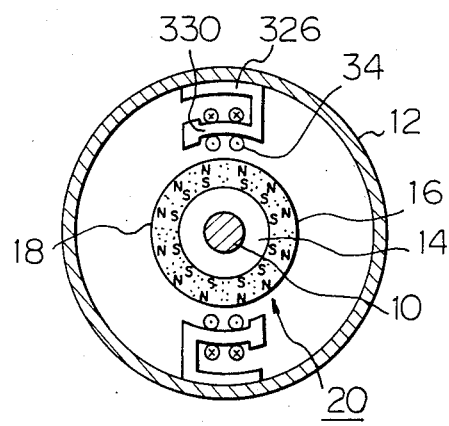

The embodiment shown in FIG. 15 includes a pair of armature cores 326, each of which has a single L-shape arm 330 extending generally in parallel with the cylindrical surface 18 of rotor magnet 16. Arm 330 also has coil windings 34 wound thereon.

Figure 14:
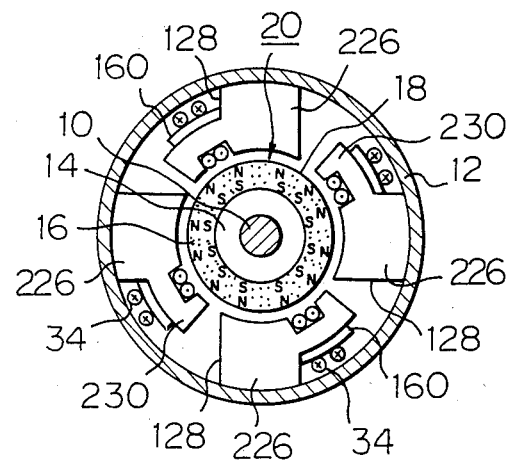
FIGS. 14 and 15 show in a lateral cross-sectional view alternative embodiments of the present invention.
Figure 16:
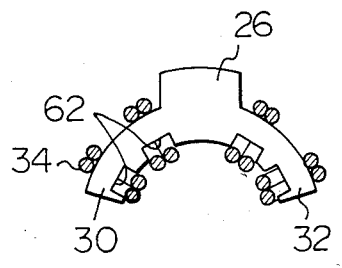
FIGS. 16 and 17 are end views of armature cores partially in section which views are useful for understanding the method of preparing the armature involved in the illustrative embodiments.

In the embodiments shown in FIGS. 14 and 16, armature windings 34 are positioned so as to intersect the primary magnetic flux emanating from rotor magnet 16. Accordingly, a constant torque is applied to rotor 20 whenever current is supplied to windings 34. Rotor 20 will continuously rotate. Rotor 20 may have the same structural features as those of the embodiments described earlier.

Figure 17:
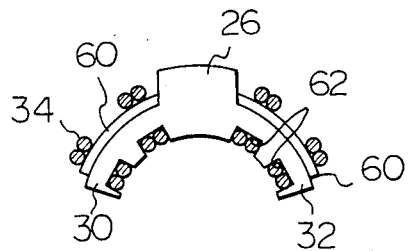

Now referring to FIGS. 16 and 17, a method of preparing coil windings 34 on armature cores 26 will be described. A length of coil wire is first wound on an adequate winding frame, not shown, and is then positioned over arm 30 or 32 of armature cores 26. On one side of those arms 30 and 32, there are cut grooves 62 which are extended in a longitudinal direction of cylindrical casing 12 to which armature core is fixed later. Thus wound coils 34 are then brought over those associated grooves 62. Then, a board or spacer 60 is inserted between one of the main surfaces of arcuate arms 30 and 32 which are opposite to rotor magnet 16, so that portions of windings 34 which are on the main surfaces of arms 30 and 32 facing rotor magnet 16 will be received by those grooves 62 appropriately, as shown in FIG. 17.

Figure 4:
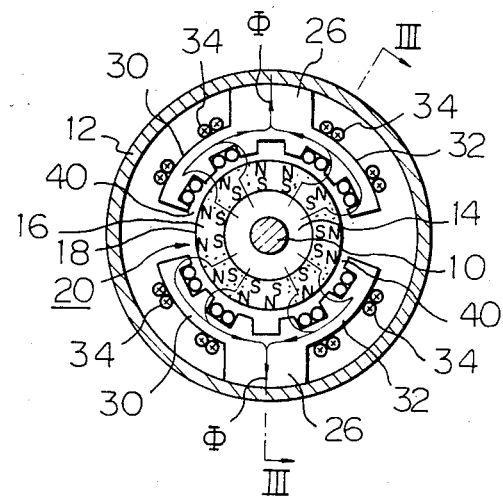
FIG. 4 is a lateral cross-sectional view showing the end face of the embodiment and is cut along the chain line IV in the FIG. 3.
Figure 5:
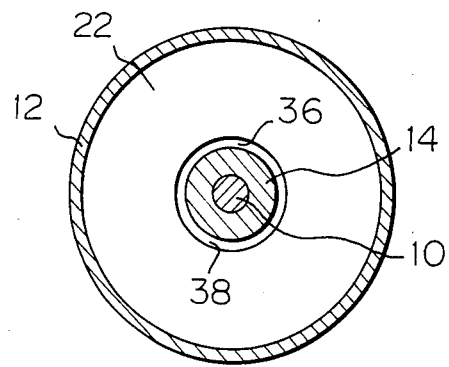
FIG. 5 is another lateral cross-sectional view showing the end face of the embodiment and is cut along dotted line V in the FIG. 3.
Figure 18:
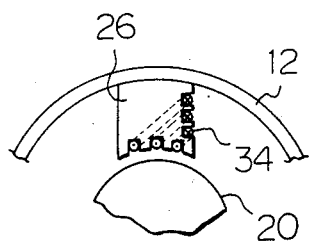
FIG. 18 is an end view of another armature core partially in sections and shows another example of the structure of the armature employable in the illustrative embodiments.

In order to accomplish the intersection of the magnetic flux originating from rotor magnet 16 to at least a portion of coil windings 34, it is sufficient to dispose part of windings 34 in parallel with the longitudinal axis of rotor 20 within air gap 40, FIG. 4. Coil 34 may be wound on armature core 26 in the form as shown in FIG. 18.

Figure 19:
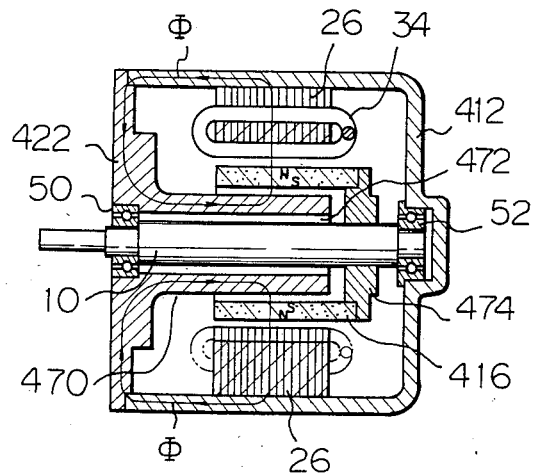
FIG. 19 is a longitudinal cross-sectional view similar to FIG. 3 and shows still another embodiment of the present invention.

Another alternative embodiment is shown in FIG. 19 and includes a cup-like stator frame or casing 412, which is covered with a cap member 422. Casing 412 has a generally cylindrical shape, and an inner surface which has armature cores 26 fixed as shown in the figure. Casing 412 and cap member 422 are both made of magnetically permeable material.

Cap member 422 is provided with a cylindrical projecting portion 470 extending in the longitudinal direction of the motor, that is, substantially perpendicular to the plane formed by cap member 422. Extending portion 470 has a central opening 472 and rotor shaft 10 is rotatably received therein. Cap member 422 is also provided with bearing 50, and the bottom portion of cup frame 412 is also provided with bearing 52. Both bearings 50 and 52 rotatably support rotor shaft 10.

The rotor shaft 10, supports a rotor magnet 416 by means of a supporting member 474. Supporting member 474 comprises a disk that is fixed on rotor shaft 10 for fixedly carrying rotor magnet 416 thereon, the rotor magnet 416 is of a cylindrical shape and magnetized with a polarity as that its outer and inner surface portions have the north and south poles, respectively. Opposite polarity orientation may of course be applicable. Rotor magnet 416 is so aligned that the longitudinal axis of cylindrical magnet 416 is substantially in parallel to rotor shaft 10. The magnet 416 also encloses a substantial portion of projecting part 470 of cap member 422, as shown in the figure.

In operation, the magnetic flux $\Phi$ produced from rotor magnet 416 passes armature cores 26 and cap member 422 to return thereto, as depicted by the arrows in the figure. Current flowing over armature windings 34 will cause the magnetic flux $\Phi$ to be turned as discussed before with reference to the former embodiments, so that rotor 20 may continuously rotate in the same direction.

Figure 20:
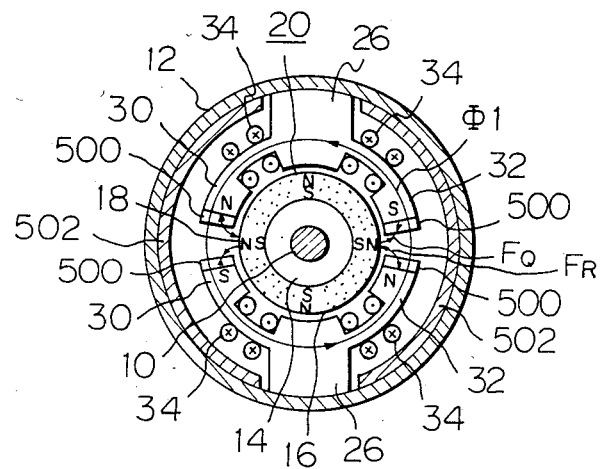
FIG. 20 is a lateral cross-sectional view similar to FIG. 4 and shows still another embodiment of the present invention enabling an improvement in the total performance of the motor.

General performance of the embodiments of the present invention will be further improved by utilizing more effectively the main magnetic flux produced by the rotor magnets. Referring to FIG. 20, for example. The magnetic flux $\Phi 1$ induced by the current conducted over armature windings 34 causes the north and south magnetic poles to be located at the end portions 30 and 32, respectively as, indicated in the figure. The thus induced magnetic poles produce magnetic repulsive and attractive forces FR and RQ, respectively, against the outer cylindrical surface 18 of rotor magnet 16, as depicted in the figure. Those repulsive and attractive forces FR and FQ are effective to prevent rotor 20 from rotating. In the illustrative embodiment shown in FIG. 20, chips of non-magnetic substances 500 may be applied to the end surfaces of arcuate arms 30 and 32 of armature cores 26.

In the embodiments shown in FIG. 20, sheets of non-magnetic substances may also be applied to the inner cylindrical surface of the stator frame 12 in order to prevent the total efficiency of the motor from being degraded due to the leakage of the magnetic flux that would otherwise have occurred from the induced poles to stator frame 12.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The illustrative embodiments are directed to brushless dc motors. Those dc motors may also be applicable to brushless dc generators in such a manner that the rotors can be driven by means of appropriate mechanical driving sources, such as an engine. The thus driven rotors are continuously rotated and will produce electric power from the armature windings in the polarity opposite to that supplied thereto in the case of the dc motors. The present invention is thus applicable to both dc motors and dc generators.

With brushless dc generators constructed and operated in accordance with the present invention, voltage appearing across the armature windings is dependent upon the angular speed of the rotors, so that the generators may be applied to tachogenerators producing voltage signals representative of the angular velocity of the rotor thereof. In addition, a dc motor having one or some of the armature coil windings used as a generator coil winding or windings may advantageouly be applicable to a motor in which the revolutionary speed in self-controlled in response to the fed-back voltage induced across the generator winding or windings.

What is claimed is:
1. A dc electromagnetic rotary machine comprising: permanent magnet means for producing magnetic flux, said permanent magnet means having a gener- ally circular hollow shape which has outer and inner cylindrical surface portions, said outer cylindrical surface portion being magnetized in one magnetic polarity and the inner cylindrical surface portion being magnetized in the other magnetic polarity opposite to the one polarity;

rotor shaft means for fixedly carrying said permanent magnet means thereon;

casing means including a magnetically permeable substance for rotatably supporting said rotor shaft means;

armature core means fixedly supported by said casing means so as to face substantially the one surface portion of said permanent magnet means for permeating the magnetic flux therethrough;

coil means supported by said armature core means for conducting current therethrough, a portion of said coil means being positioned in a gap formed between said armature core means and said permanent magnet means; and magnetic-path forming means extending from said casing means toward said rotor shaft means for bridging the magnetic flux between said casing means and said permanent magnet means;

whereby the current flowing over said coil means causes the magnetic flux emanating from said permanent magnet means to be turned partially.

2. A machine in accordance with claim 1, wherein said one and other magnetic polarities are the magnetic north and south poles, respectively.

3. A machine in accordance with claim 1, wherein said rotor shaft means comprises rotary yoke means including a magnetically permeable substance for fixedly carrying said permanent magnet means thereon.

4. A machine in accordance with claim 1, wherein said permanent magnet means is of a generally disk-like shape, which has one main flat surface portion magnetized in the one magnetic polarity and the other main flat surface portion opposite to the one surface portion magnetized in the other magnetic polarity.

5. A machine in accordance with claim 1, wherein said casing means is of a generally cylindrical shape having an inner cylindrical surface and said magnetic-path forming means being generally of a cylindrical shape having a central circular opening, in which said rotor shaft means is received.

6. A machine in accordance with claim 5, wherein said magnetic-path forming means is fixedly carried on the inner cylindrical surface of said casing means.

7. A machine in accordance with claim 5, wherein said armature core means is of a generally Y-shape having a leg portion fixed on the inner cylindrical surface of said casing means, and a pair of arm portions extending along the one surface portion of said magnet means, each arm portion extending opposite the other arm portion and coil being carried on said pair of arm portions.

8. A machine in accordance with claim 5, wherein said armature core means has a leg portion fixed on the inner cylindrical surface of said casing means, and an L-shaped arm portion extending radially inwardly from said fixed portion generally parallel with said magnet means, said coil means being carried on said arm portion.

9. A machine in accordance with claim 5, wherein said armature core means is has one end portion fixed on the inner cylindrical surface of said casing means, said core means having the other end portion carrying thereon a portion of said coil means and facing the one surface portion of said magnet means.

10. A machine in accordance with claim 1, wherein said armature core means comprises at least one pair of magnetic cores, which are disposed opposite each other and which have portions which extend generally parallel to said magnet means, and carry thereon said coil means.

11. A machine in accordance with claim 1, wherein said armature core means comprises at least two sets of magnetic cores, each set comprising a pair of oppositely disposed magnetic cores, said sets being disposed in the longitudinal direction of said rotor shaft means, said magnet means comprising a corresponding number of permanent, corresponding to the number of said sets, disposed correspondingly in the longitudinal direction.

12. A machine in accordance with claim 11, wherein said armature core means includes said magnetic-path forming means.

13. A machine in accordance with claim 1, wherein said casing means includes said magnetic-path forming means.

14. A machine in accordance with claim 1, wherein said coil means is capable of being supplied with current to produce additional magnetic flux so as to cause the magnetic flux emanting from said permanent magnet means to be turned, thereby to rotate said rotor shaft means in an angular direction in dependence upon the current supplied.

15. A machine in accordance with claim 1, wherein said rotor shaft means is capable of being driven in rotation to produce current over said coil means, thereby to produce electric power associated with the rotation of said rotor shaft means.

16. A machine in accordance with claim 1, wherein said armature core means comprises at least one core having an arm portion with the outer end and a member of non-magnetic substance provided on said outer end.

17. A machine in accordance with claim 1, wherein said casing means has a sheet of nonmagnetic substance provided on the inner cylindrical surface of said casing means and between said armature means and said casing means.

* * * * *

UNITED STATES PATENT AND TRADEMARK OFFICE
CERTIFICATE OF CORRECTION

PATENT NO. : 4,564,778
DATED : January 14, 1986
INVENTOR(S) : Makoto Yoshida

It is certified that error appears in the above-identified patent and that said Letters Patent is hereby corrected as shown below:

In the Abstract, line 16, "magent" should be --magnet--;

Column 1, line 21, "riples" should be --ripples--;

Column 2, line 9, "with" should be --without--;

line 41, "the" should be --a--; "a" should be --the--;

line 56, "chain" should be --dotted--;

line 57, delete "the";

line 60, delete "the".

Column 3, line 37, delete "On rotary shaft 10,"; change "fixedly" to --Fixedly--;

line 39, delete "fixedly carried on";

UNITED STATES PATENT AND TRADEMARK OFFICE
CERTIFICATE OF CORRECTION

PATENT NO. : 4,564,778

DATED : January 14, 1986

INVENTOR(S) : Makoto Yoshida

It is certified that error appears in the above-identified patent and that said Letters Patent is hereby corrected as shown below:

line 40, delete "Magnetic" and insert --Fixedly carried on magnetic--;

Column 4, line 45, "possess" should be --passes--;

Column 5, line 25, delete "thereon";

line 52, "permanet" should be --permanent--;

line 59, "x" should be --$\underline{x}$--.

Column 6, line 42, "S," should be --S.--; change "in" to --In--.

UNITED STATES PATENT AND TRADEMARK OFFICE
CERTIFICATE OF CORRECTION

PATENT NO. : 4,564,778
DATED : January 14, 1986
INVENTOR(S) : Makoto Yoshida

It is certified that error appears in the above-identified patent and that said Letters Patent is hereby corrected as shown below:

Column 7, line 62, "thereon," should be --thereon.--; change "the" to --The--;

line 64, "as" should be --so--.

Column 8, line 15, "example. The" should be --example, the--;

line 19, before "as" insert--,--;

line 63, "in" should be --is--.

Column 10, line 11, delete "is";

line 28, after "permanent" insert --magnets--;

Signed and Sealed this

Fourth Day of November, 1986

[SEAL]

Attest:

DONALD J. QUIGG

Attesting Officer

Commissioner of Patents and Trademarks